(12) United States Patent
Tang et al.

(10) Patent No.: US 9,214,800 B2
(45) Date of Patent: Dec. 15, 2015

(54) SURGE PROTECTION CIRCUIT

(71) Applicant: Huawei Technologies Co., Ltd., Shenzhen, Guangdong (CN)

(72) Inventors: Zhanli Tang, Shanghai (CN); Xinglin Bai, Chengdu (CN); Xinglei Yang, Shanghai (CN); Chengwei Wen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 301 days.

(21) Appl. No.: 13/731,888

(22) Filed: Dec. 31, 2012

(65) Prior Publication Data

US 2013/0135777 A1    May 30, 2013

Related U.S. Application Data

(63) Continuation of application No. PCT/CN2011/074998, filed on May 31, 2011.

(30) Foreign Application Priority Data

Nov. 22, 2010    (CN) .................... 2010 2 0620604 U

(51) Int. Cl.
    *H02H 1/00*    (2006.01)
    *H02H 3/22*    (2006.01)
    *H02H 9/06*    (2006.01)
    *H01H 1/00*    (2006.01)

(52) U.S. Cl.
    CPC .. *H02H 3/22* (2013.01); *H02H 9/06* (2013.01)

(58) Field of Classification Search
    CPC .......... H02H 3/22; H02H 9/042; H02H 9/043

USPC .................................................. 361/127, 126
    See application file for complete search history.

(56) References Cited

U.S. PATENT DOCUMENTS 3,714,628 A * 1/1973 Sloger ...................... 307/10.3
2006/0262478 A1 11/2006 Chaudhry
(Continued)

FOREIGN PATENT DOCUMENTS

| CA | 2 254 491 A1 | 5/2000 |
| CN | 2376112 Y | 4/2000 |
| CN | 1339858 A | 3/2002 |

(Continued)

OTHER PUBLICATIONS

International Search Report dated Sep. 8, 2011 in connection with International Patent Application No. PCT/CN2011/074998.
(Continued)

*Primary Examiner* — Thienvu Tran
*Assistant Examiner* — Lucy Thomas

(57) ABSTRACT

A surge protection circuit includes a surge protection unit and an interface electrically connected to each other. The surge protection unit includes an internal connection terminal block, three varistors and one discharge tube. The three varistors are electrically connected to the internal connection terminal block, where two varistors are electrically connected to the discharge tube. The discharge tube is also electrically connected to the internal connection terminal block and is grounded. The surge protection circuit can avoid connecting a varistor to the discharge tube in series and reduce a residual voltage of the surge protection circuit.

13 Claims, 10 Drawing Sheets

(56) References Cited

U.S. PATENT DOCUMENTS

2008/0122573 A1    5/2008    Ulaner et al.
2009/0154034 A1    6/2009    Tallam

FOREIGN PATENT DOCUMENTS

| CN | 2786850 Y | 6/2006 |
|----|-----------|--------|
| CN | 2893719 Y | 4/2007 |
| JP | 10326702 A | 12/1998 |
| WO | WO 2007/088932 A1 | 8/2007 |

OTHER PUBLICATIONS

Written Opinion of the International Searching Authority dated Sep. 8, 2011 in connection with International Patent Application No. PCT/CN2011/074998.

Supplementary European Search Report dated Jun. 28, 2013 in connection with European Patent Application No. 11 78 9207.

* cited by examiner

US 9,214,800 B2

SURGE PROTECTION CIRCUIT

CROSS-REFERENCE TO RELATED APPLICATIONS

This application is a continuation of International Application No. PCT/CN2011/074998, filed on May 31, 2011, which claims priority to Chinese Patent Application No. 201020620604.3, filed on Nov. 22, 2010, both of which are hereby incorporated by reference in their entireties.

TECHNICAL FIELD

The present utility model relates to the field of electronic communications, and in particular, to a surge protection circuit.

BACKGROUND

In the field of electronic communications, a protection technology is required to ensure stable and reliable operation of communication equipment. For example, a surge protection circuit disposed at a power port or a signal port of the communication equipment can ensure stable and reliable operation of the communication equipment in a severe electromagnetic environment.

Referring to FIG. 1, the prior art provides a surge protection circuit, including a surge protection unit S1 (as shown in a dotted box), a four-row external connection terminal block S2, and a conversion terminal block S3. The surge protection unit S1 includes an internal connection terminal block S11, a first varistor S12, a second varistor S13, a third varistor S14, a fourth varistor S15, and a discharge tube S16. The internal connection terminal block S11 includes a first internal connection terminal L11, a second internal connection terminal L12, a third internal connection terminal L13, and a fourth internal connection terminal N1. One end of the first varistor S12, one end of the second varistor S13, and one end of the third varistor S14 are electrically connected to the first internal connection terminal L11, the second internal connection terminal L12, and the third internal connection terminal L13, respectively; and the other ends of the varistors are connected in parallel together and electrically connected to one end of the fourth varistor S15 and the fourth internal connection terminal N1. The other end of the fourth varistor S15 is electrically connected to one end of the discharge tube S16, and the other end of the discharge tube S16 is grounded. The four-row external connection terminal block S2 includes a first external connection terminal L21, a second external connection terminal L22, a third external connection terminal L23, and a fourth external connection terminal N2. The conversion terminal block S3 includes a first conversion terminal A, a second conversion terminal B, a third conversion terminal C, and a fourth conversion terminal D. The first external connection terminal L21, the second external connection terminal L22, the third external connection terminal L23, and the fourth external connection terminal N2 are electrically connected to the first conversion terminal A, the second conversion terminal B, the third conversion terminal C, and the fourth conversion terminal D, respectively.

Through the surge protection circuit, a 220 V three-phase power distribution manner, a 220 V single-phase power distribution manner, and a 110 V dual live wire power distribution manner can be implemented. In the 220 V three-phase power distribution manner shown in FIG. 1, the first conversion terminal A, the second conversion terminal B, the third conversion terminal C, and the fourth conversion terminal D are electrically connected to the first internal connection terminal L11, the second internal connection terminal L12, the third internal connection terminal L13, and the fourth internal connection terminal N1 through cables, respectively; and then a 220 V phase wire L1, a 220 V phase wire L2, and a 220 V phase wire L3 are electrically connected to the first external connection terminal L21, the second external connection terminal L22, and the third external connection terminal L23, respectively; and a phase wire N is electrically connected to the fourth external connection terminal N2. In the 220 V single-phase power distribution manner shown in FIG. 2, the internal connection terminals L11, L12 and L13 are electrically connected to the conversion terminal A through cables, and the fourth internal connection terminal N1 is electrically connected to the fourth conversion terminal D through a cable. A 220 V phase live wire L is electrically connected to the first external connection terminal L21, and a phase wire N is electrically connected to the fourth external connection terminal N2. In the 110 V dual live wire power distribution manner shown in FIG. 3, the first internal connection terminal L11, the second internal connection terminal L12, and the third internal connection terminal L13 are electrically connected to the second conversion terminal B through cables, and the fourth internal connection terminal N1 is electrically connected to the third conversion terminal C. A 110 V phase live wire L1 and a 110 V phase live wire L2 are electrically connected to the second external connection terminal L22 and the third external connection terminal L23, respectively.

In normal circumstances, for any one of the foregoing power distribution manners, the voltage across the first varistor S12, the second varistor S13, and the third varistor S14 is 220 V or 110 V. The higher the voltage across a varistor is, the smaller the resistance value of the varistor, and the lower the voltage across a varistor is, the larger the resistance value of the varistor is. In this case, resistance values of the first varistor S12, the second varistor S13, and the third varistor S14 are very large. Currents shunted by the first varistor S12, the second varistor S13, and the third varistor S14 from the first internal connection terminal L11, the second internal connection terminal L12, and the third internal connection terminal L13 are nearly zero, and most of currents on the first internal connection terminal L11, the second internal connection terminal L12, and the third internal connection terminal L13 are transmitted to the communication equipment. After the phase wire L1, L2, L3 or L externally connected to the surge protection circuit is struck by lightning, the voltage of the first internal connection terminal L11, the second internal connection terminal L12 or the third internal connection terminal L13 becomes very high, and the voltages across the first varistor S12, the second varistor S13, and the third varistor S14 become very high accordingly. In this case, the resistance values of the first varistor S12, the second varistor S13 and the third varistor S14 become very small. The first varistor S12, the second varistor S13, and the third varistor S14 shunt most of the currents on the first internal connection terminal L11, the second internal connection terminal L12 and the third internal connection terminal L13, respectively, onto the discharge tube S16, and the discharge tube S16 releases the currents to a grounded place. The currents transmitted by the first internal connection terminal L11, the second internal connection terminal L12 and the third internal connection terminal L13 to the communication equipment are small. In this way, a surge protection function is implemented.

During implementation of the present utility model, it is found that the prior art at least has the following problems:

After lightning strike, the currents on the first varistor S12, the second varistor S13, and the third varistor S14 are very large, a parallel current obtained after the three varistors are connected in parallel is greater, it is hard to find a fourth varistor S15 capable of bearing the parallel current. In addition, a residual voltage of the surge protection circuit includes a voltage of the fourth varistor S15 and a voltage of the discharge tube S16, and therefore, the residual voltage of the surge protection circuit is high.

SUMMARY

In order to avoid connecting a varistor to a discharge tube in series and reduce a residual voltage of a surge protection circuit, the present utility model provides a surge protection circuit. The technical solution is as follows:

A surge protection circuit includes:

a surge protection unit and an interface, where the surge protection unit is electrically connected to the interface, the surge protection unit includes an internal connection terminal block, three varistors and one discharge tube, and the three varistors are electrically connected to the internal connection terminal block, two varistors of the three varistors are electrically connected to the discharge tube, and the discharge tube is electrically connected to the internal connection terminal block and is grounded.

It is avoided that a varistor is connected to the discharge tube 15 in series, and a residual voltage of the surge protection circuit includes a voltage of the discharge tube only, thereby reducing the residual voltage of the surge protection circuit.

DETAILED DESCRIPTION

To illustrate the objectives, technical solutions and advantages of the present utility model more clearly, the embodiments of the present utility model are further described in the following with reference to the accompanying drawings.

Embodiment 1

Figure 1:
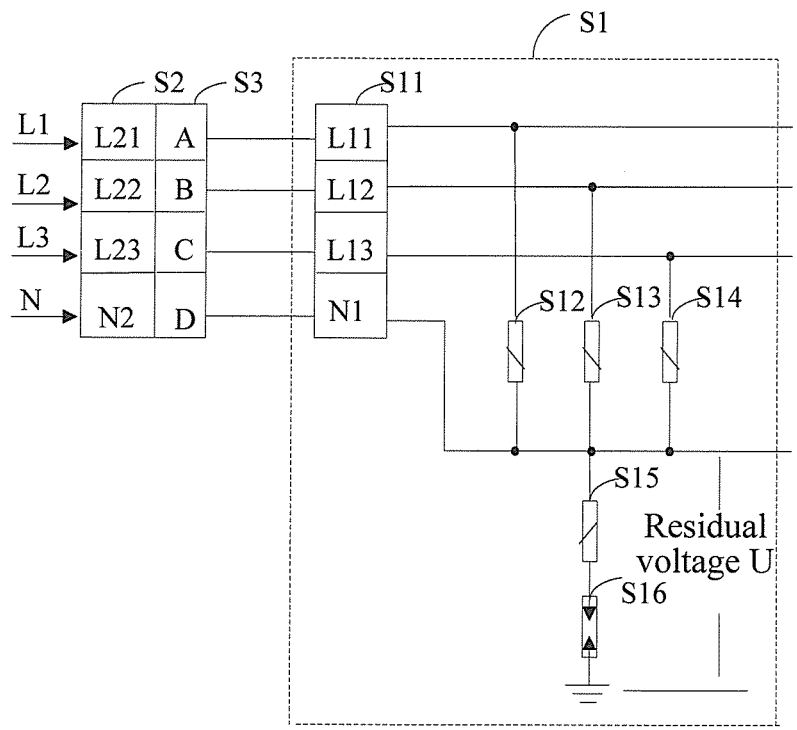
FIG. 1 is a schematic diagram of implementation of a 220 V three-phase power distribution manner by using a surge protection circuit provided by the prior art.
Figure 2:
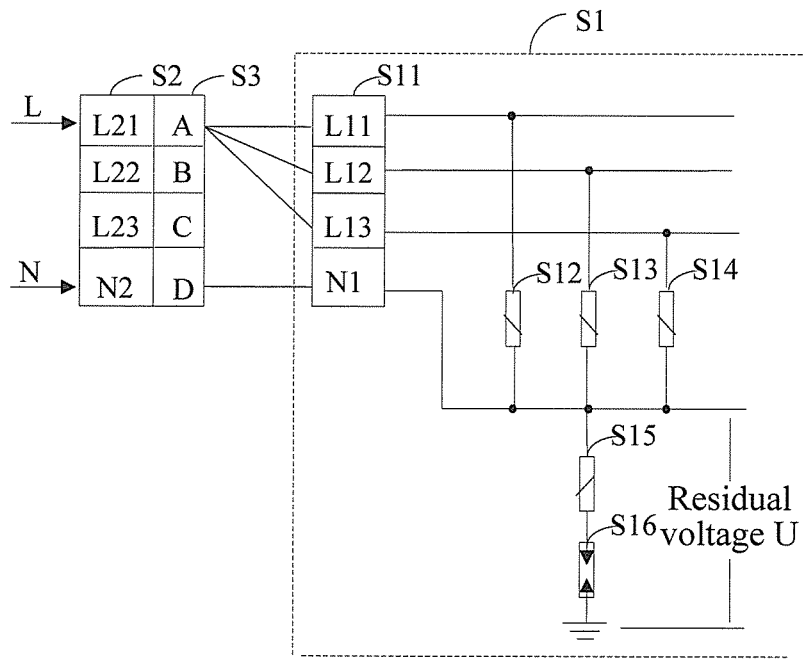
FIG. 2 is a schematic diagram of implementation of a 220 V single-phase power distribution manner by using a surge protection circuit provided by the prior art.
Figure 3:
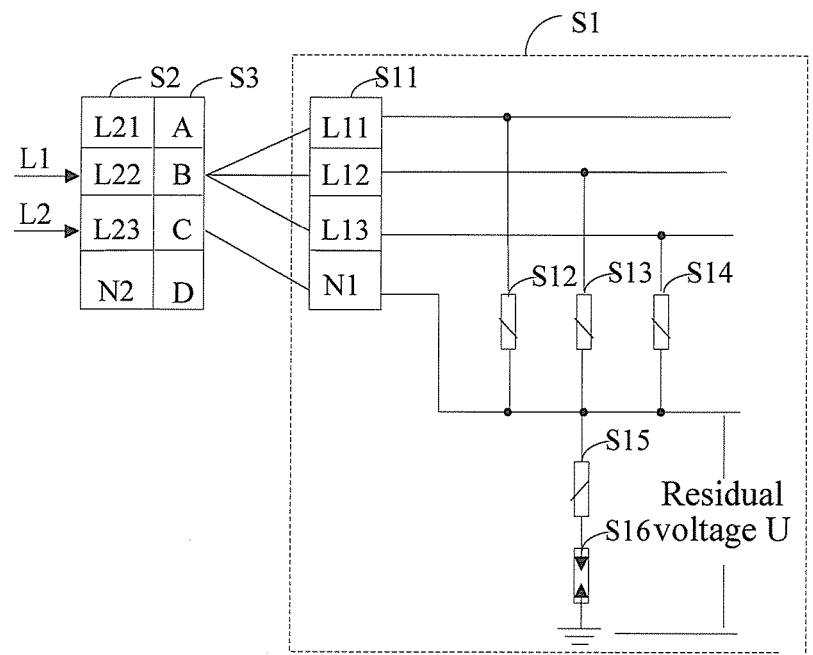
FIG. 3 is a schematic diagram of implementation of a 110 V dual live wire power distribution manner by using a surge protection circuit provided by the prior art.
Figure 4:
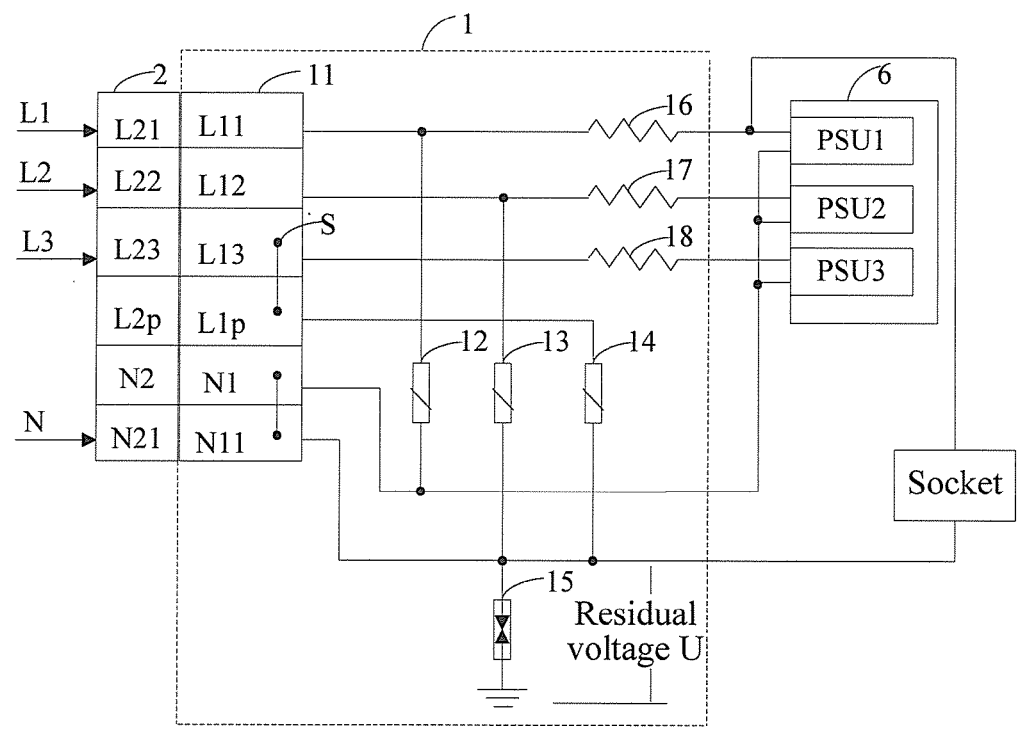
FIG. 4 is a schematic diagram of implementation of 220 V three-phase power distribution by using a surge protection circuit provided by Embodiment 1 of the present utility model.

As shown in FIG. 4, an embodiment of the present utility model provides a surge protection circuit, including:

a surge protection unit 1 and a six-row external connection terminal block 2, where the surge protection unit 1 includes an internal connection terminal block 11, a first varistor 12, a second varistor 13, a third varistor 14, and a discharge tube 15, and the internal connection terminal block 11 includes a first internal connection terminal L11, a second internal connection terminal L12, a third internal connection terminal L13, a fourth internal connection terminal L1p, a fifth internal connection terminal N1, and a sixth internal connection terminal N11, and the six-row external connection terminal block 2 includes a first external connection terminal L21, a second external connection terminal L22, a third external connection terminal L23, a fourth external connection terminal L2p, a fifth external connection terminal N2, and a sixth external connection terminal N21.

One end of the first varistor 12, one end of the second varistor 13, and one end of the third varistor 14 are electrically connected to the first internal connection terminal L11, the second internal connection terminal L12, and the fourth internal connection terminal L1p, respectively. The other end of the first varistor 12 is electrically connected to the fifth internal connection terminal N1. The other end of the second varistor 13 and the other end of the third varistor 14 are connected together in parallel, and are electrically connected to one end of the discharge tube 15 and the sixth internal connection terminal N11, and the other end of the discharge tube 15 is grounded. The first external connection terminal L21, the second external connection terminal L22, the third external connection terminal L23, the fourth external connection terminal L2p, the fifth external connection terminal N2, and the sixth external connection terminal N21 are electrically connected to the first internal connection terminal L11, the second internal connection terminal L12, the third internal connection terminal L13, the fourth internal connection terminal L1p, the fifth internal connection terminal N1, and the sixth internal connection terminal N11, respectively.

Further, the surge protection unit 1 may also include three filter inductors, that is, a first filter inductor 16, a second filter inductor 17, and a third filter inductor 18, where the first filter inductor 16, the second filter inductor 17, and the third filter inductor 18 are electrically connected to the first internal connection terminal L11, the second internal connection terminal L12, and the third internal connection terminal L13, respectively.

Referring to FIG. 4, this embodiment provides a cabinet, including the surge protection circuit provided by this embodiment and a cabinet body 6, where the surge protection circuit is electrically connected to a port of the cabinet body 6 directly. The port of the cabinet body 6 includes a power port or a signal port. For example, the cabinet body 6 includes a first power port PSU1, a second power port PSU2, and a third power port PSU3, where the first power port PSU1 is electrically connected to the first filter inductor 16 and the fifth internal connection terminal N1 in the surge protection unit 1, the second power port PSU2 is electrically connected to the second filter inductor 17 and the fifth internal connection terminal N1 in the surge protection unit 1, and the third power port PSU3 is electrically connected to the third filter inductor 18 and the fifth internal connection terminal N1 in the surge protection unit 1. In addition, a socket may also be externally connected to the cabinet, where the socket is electrically connected to the first filter inductor 16 and the sixth internal connection terminal N11 in the surge protection unit 1. When detection equipment is used to detect the surge protection circuit, the socket may supply power to the detection equipment.

Through the surge protection circuit provided by this embodiment, a 220 V three-phase power distribution manner, a 220 V single-phase power distribution manner, and a 110 V dual live wire power distribution manner can be implemented.

In a circuit structure of the 220 V three-phase power distribution manner shown in FIG. 4, short connection sheets S are used to electrically connect the fifth internal connection terminal N1 and the sixth internal connection terminal N11 together, and electrically connect the third internal connection terminal L13 and the fourth internal connection terminal L1p together. The 220 V three-phase wires L1, L2 and L3 are electrically connected to the first external connection terminal L21, the second external connection terminal L22, and the third external connection terminal L23, respectively; and a phase wire N is electrically connected to the sixth external connection terminal N21.

If the phase wires L1, L2, and L3 are struck by lightning, voltages of the first internal connection terminal L11, the second internal connection terminal L12, the third internal connection terminal L13, and the fourth internal connection terminal L1p become very high, and voltages of the first varistor 12, the second varistor 13, and the third varistor 14 become very high accordingly. Resistance values of the first varistor 12, the second varistor 13, and the third varistor 14 become very small, so that the first varistor 12, the second varistor 13, and the third varistor 14 shunt most of currents on the first internal connection terminal L11, the second internal connection terminal L12, and the third internal connection terminal L13, respectively, onto the discharge tube 15, and the discharge tube 15 releases the currents to a grounded place. In this way, a surge protection function is implemented.

Figure 5:
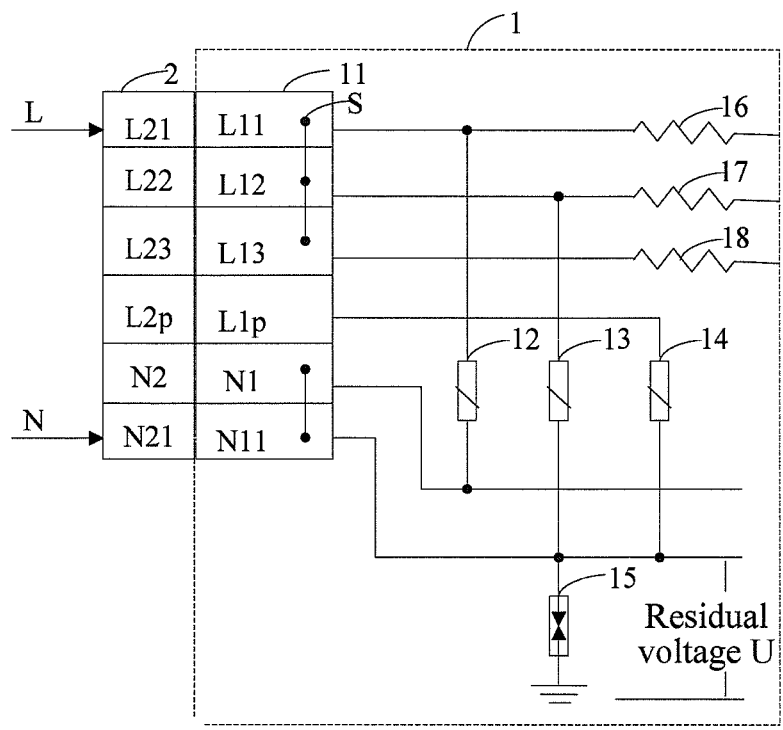
FIG. 5 is a schematic diagram of implementation of 220 V single-phase power distribution by using the surge protection circuit provided by Embodiment 1 of the present utility model.

In a circuit structure of the 220 V single-phase power distribution manner shown in FIG. 5, short connection sheets S are used to electrically connect the first internal connection terminal L11, the second internal connection terminal L12, and the third internal connection terminal L13 together, and electrically connect the fifth internal connection terminal N1 and the sixth internal connection terminal N11 together. A 220 V phase wire L is electrically connected to the first external connection terminal L21, and a phase wire N is electrically connected to the sixth external connection terminal N21.

If the phase wire L is struck by lightning, voltages of the first internal connection terminal L11, the second internal connection terminal L12, and the third internal connection terminal L13 become very high, and voltages of the first varistor 12 and the second varistor 13 become very high accordingly. In this case, resistance values of the first varistor 12 and the second varistor 13 become very small, so that the first varistor 12 and the second varistor 13 shunt most of currents of the first internal connection terminal L11, the second internal connection terminal L12, and the third internal connection terminal L13 onto the discharge tube 15, and the discharge tube 15 releases the currents to a grounded place. In this way, a surge protection function is implemented.

Figure 6:
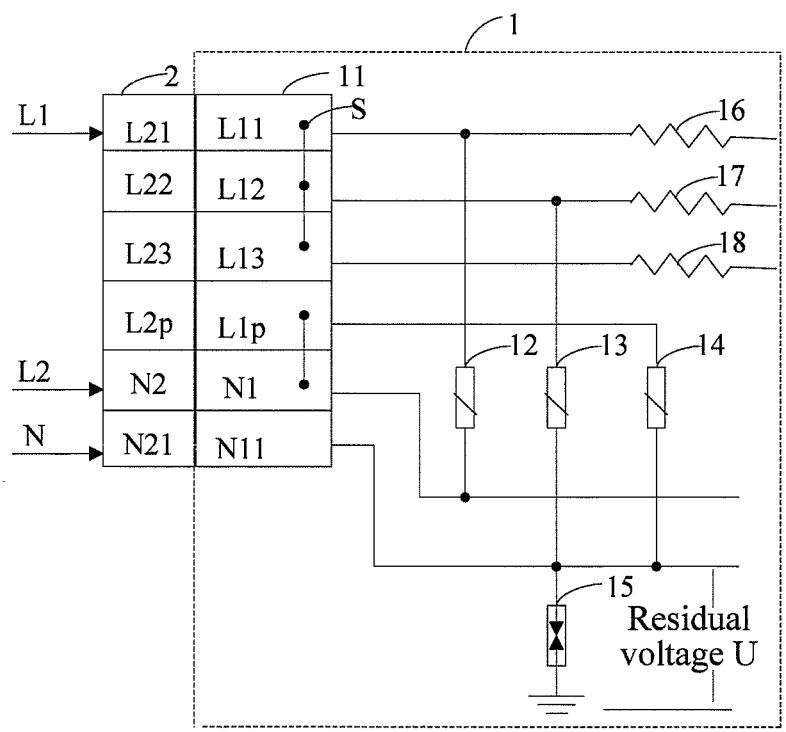
FIG. 6 is a schematic diagram of implementation of 110 V dual live wire power distribution by using the surge protection circuit provided by Embodiment 1 of the present utility model.

In a circuit structure of the 110 V dual live wire power distribution manner shown in FIG. 6, short connection sheets S are used to electrically connect the first internal connection terminal L11, the second internal connection terminal L12, and the third internal connection terminal L13 together, and electrically connect the fourth internal connection terminal L1p and the fifth internal connection terminal N1 together. The 110 V dual live wires L1 and L2 are electrically connected to the first external connection terminal L21 and the fifth external connection terminal N2, respectively; and a phase wire N is electrically connected to the sixth external connection terminal N21.

If the phase wires L1 and L2 are struck by lightning, voltages of the first internal connection terminal L11, the second internal connection terminal L12, the third internal connection terminal L13, the fourth internal connection terminal L1p, and the fifth internal connection terminal N1 become very high, and voltages of the second varistor 13 and the third varistor 14 become very high. In this case, resistance values of the second varistor 13 and the third varistor 14 become very small, and the second varistor 13 and the third varistor 14 shunt most of currents of the first internal connection terminal L11, the second internal connection terminal L12, the third internal connection terminal L13, the fourth internal connection terminal L1p, and the fifth internal connection terminal N1 onto the discharge tube 15, and the discharge tube 15 releases the currents to a grounded place. In this way, a surge protection function is implemented.

The discharge tube 15 cannot be directly connected to a live wire. Referring to FIG. 4, FIG. 5, and FIG. 6, the internal connection terminal block 11 includes a six-row internal connection terminal, and one end of the discharge tube 15 is electrically connected to the sixth internal connection terminal N11. During implementation of the 220 V three-phase power distribution manner, the 220 V single-phase power distribution manner, and the 110 V dual live wire power distribution manner, it can be avoided that the live wire is directly connected to the discharge tube 15, and it is not required to connect a varistor to the discharge tube 15 in series. In addition, a residual voltage of the surge protection circuit is a voltage of the discharge tube 15, so the residual voltage of the surge protection circuit is lower than a residual voltage of an existing surge protection circuit.

The six-row external connection terminal block 2 is electrically connected to the internal connection terminal block 11 directly. During implementation of different power distribution manners, it is only required to use the short connection sheets S to connect a part of the internal connection terminals together, and no space needs to be reserved between the six-row external connection terminal block 2 and the internal connection terminal block 11 for wiring, thereby reducing the volume of the surge protection circuit.

In this embodiment, it is not required to connect a varistor to the discharge tube 15 in series. In addition, the residual voltage of the surge protection circuit includes the voltage of the discharge tube only, thereby reducing the residual voltage of the surge protection circuit.

Embodiment 2

Figure 7:
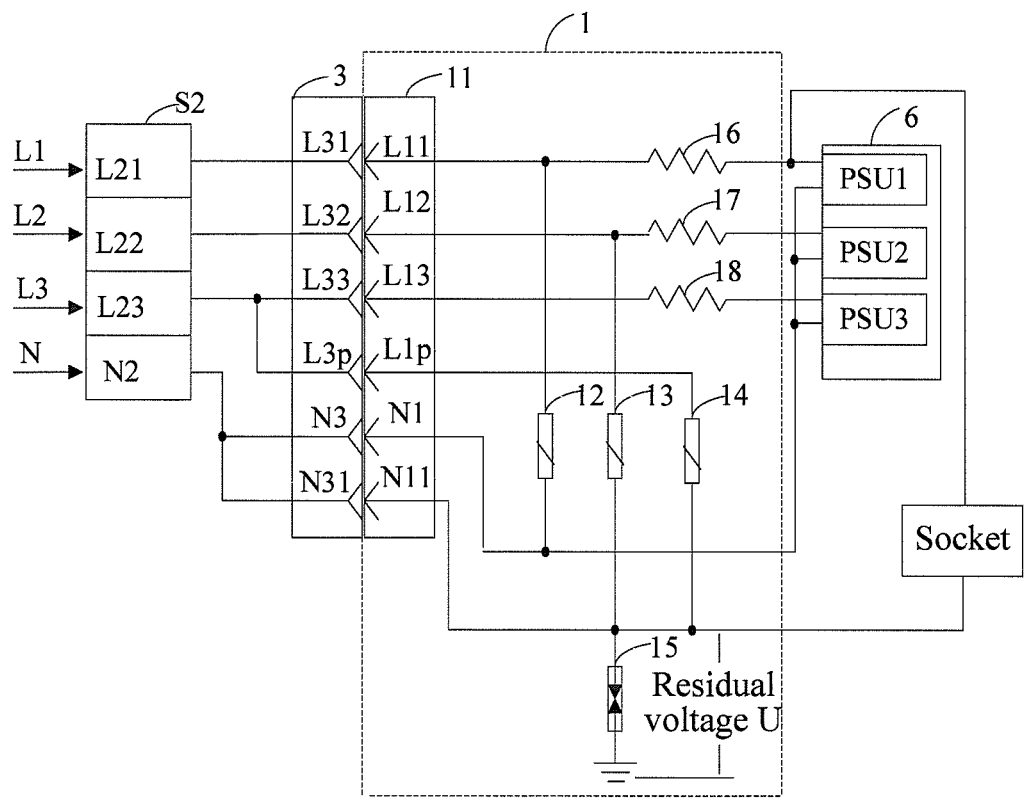
FIG. 7 is a schematic diagram of implementation of 220 V three-phase power distribution by using a surge protection circuit provided by Embodiment 2 of the present utility model.

An embodiment of the present utility model provides a surge protection circuit, where the surge protection circuit can implement a 220 V three-phase power distribution manner and a 220 V single-phase power distribution manner. Referring to FIG. 7, the surge protection circuit includes a surge protection unit 1, a four-row external connection terminal block S2, and a conversion terminal block 3.

The surge protection unit 1 includes an internal connection terminal block 11, a first varistor 12, a second varistor 13, a third varistor 14, and a discharge tube 15, where the internal connection terminal block 11 includes a first internal connection terminal L11, a second internal connection terminal L12, a third internal connection terminal L13, a fourth internal connection terminal L1p, a fifth internal connection terminal N1, and a sixth internal connection terminal N11. One end of the first varistor 12, one end of the second varistor 13, and one end of the third varistor 14 are electrically connected to the first internal connection terminal L11, the second internal connection terminal L12, and the fourth internal connection terminal L1p, respectively. The other end of the first varistor 12 is electrically connected to the fifth internal connection terminal N1. The other end of the second varistor 13 and the other end of the third varistor 14 are connected together in parallel, and are electrically connected to the sixth internal connection terminal N11 and one end of the discharge tube 15, and the other end of the discharge tube 15 is grounded.

The four-row external connection terminal block S2 includes a first external connection terminal L21, a second external connection terminal L22, a third external connection terminal L23, and a fourth external connection terminal N2. The conversion terminal block 3 includes a first conversion terminal L31, a second conversion terminal L32, a third conversion terminal L33, a fourth conversion terminal L3p, a fifth conversion terminal N3, and a sixth conversion terminal N31. The first conversion terminal L31 and the second conversion terminal L32 are electrically connected to the first external connection terminal L21 and the second external connection terminal L22, respectively. The third conversion terminal L33 and the fourth conversion terminal L3p are electrically connected to the third external connection terminal L23. The fifth conversion terminal N3 and the sixth conversion terminal N31 are electrically connected to the fourth external connection terminal N2.

The conversion terminal block 3 and the internal connection terminal block 11 serve as a socket and a plug, respectively; or the conversion terminal block 3 and the internal connection terminal block 11 serve as a plug and a socket, respectively. Correspondingly, by inserting the conversion terminal block 3 into the internal connection terminal block 11, the first conversion terminal L31, the second conversion terminal L32, the third conversion terminal L33, the fourth conversion terminal L3p, the fifth conversion terminal N3, and the sixth conversion terminal N31 in the conversion terminal block 3 are electrically connected to the first internal connection terminal L11, the second internal connection terminal L12, the third internal connection terminal L13, the fourth internal connection terminal L1p, the fifth internal connection terminal N1, and the sixth internal connection terminal N11 in the internal connection terminal block 11, respectively.

The four-row external connection terminal block S2 and the conversion terminal block 3 may be integrated onto a circuit board, and the conversion terminal block 3 may be directly inserted into the internal connection terminal block 11, and may also be directly pulled out from the internal connection terminal block 11.

Further, the surge protection unit 1 may also include three filter inductors, that is, a first filter inductor 16, a second filter inductor 17, and a third filter inductor 18, where the first filter inductor 16, the second filter inductor 17, and the third filter inductor 18 are electrically connected to the first internal connection terminal L11, the second internal connection terminal L12, and the third internal connection terminal L13, respectively.

Through the surge protection circuit provided by this embodiment, a 220 V three-phase power distribution manner and a 220 V single-phase power distribution manner can be implemented.

Referring to FIG. 7, the surge protection circuit provided by this embodiment is used to implement a circuit structure of the 220 V three-phase power distribution manner, that is, the 220 V three-phase wires L1, L2, and L3 are electrically connected to the first external connection terminal L21, the second external connection terminal L22, and the third external connection terminal L23, respectively; and a phase wire N is electrically connected to the fourth external connection terminal N2.

In the circuit structure of the 220 V three-phase power distribution manner, the surge protection circuit can implement a surge protection function, and the specific implementation process is the same as a part of the content of Embodiment 1, which is not described again herein.

Figure 8:
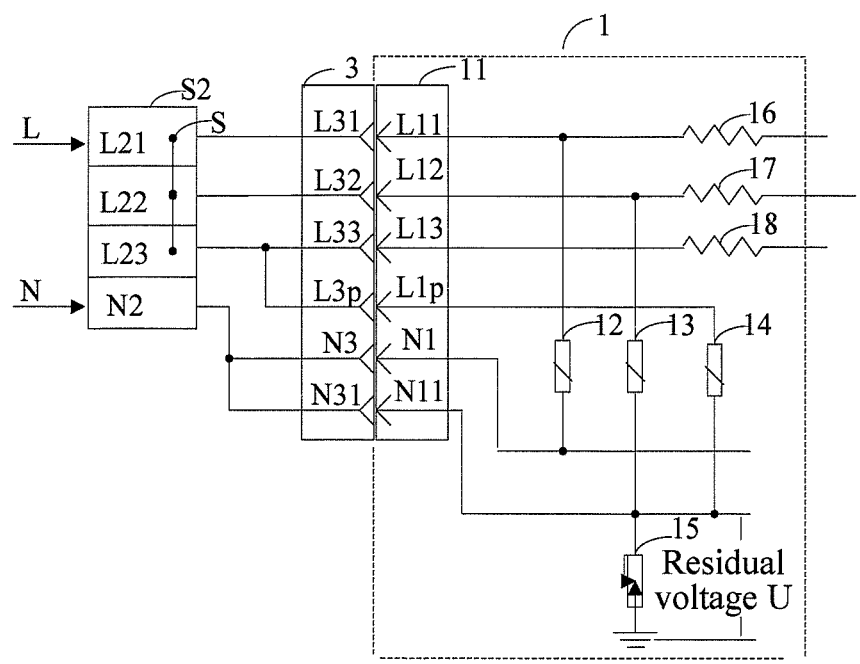
FIG. 8 is a schematic diagram of implementation of 220 V single-phase power distribution by using the surge protection circuit provided by Embodiment 2 of the present utility model.

Referring to FIG. 8, the surge protection circuit provided by this embodiment is used to implement a circuit structure of the 220 V single-phase power distribution manner, that is, a short connection sheet S is used to electrically connect the first external connection terminal L21, the second external connection terminal L22, and the third external connection terminal L23 together, and a 220 V phase wire L is electrically connected to the first external connection terminal L21, and a phase wire N is electrically connected to the fourth external connection terminal N2.

In the circuit structure of the 220 V single-phase power distribution manner, the surge protection circuit can implement a surge protection function, and the specific implementation process is the same as a part of the content of Embodiment 1, which is not described again herein.

Referring to FIG. 7 and FIG. 8, the internal connection terminal block 11 includes a six-row internal connection terminal, and one end of the discharge tube 15 is electrically connected to the sixth internal connection terminal N11. During implementation of the 220 V three-phase power distribution manner and the 220 V single-phase power distribution manner, it can be avoided that the live wire is directly connected to the discharge tube 15, and it is not required to connect a varistor to the discharge tube 15 in series. In addition, a residual voltage of the surge protection circuit is a voltage of the discharge tube 15, so the residual voltage of the surge protection circuit is lower than a residual voltage of an existing surge protection circuit.

The conversion terminal block 3 is electrically connected to the internal connection terminal block 11 directly in an insertion manner. During implementation of different power distribution manners, it is only required to use the short connection sheet S to connect a part of the external connection terminals together, and no space needs to be reserved between the conversion terminal block 3 and the internal connection terminal block 11 for wiring, thereby reducing the volume of the surge protection circuit.

Referring to FIG. 7, this embodiment provides a cabinet. The cabinet includes the surge protection circuit provided by this embodiment and a cabinet body 6. The surge protection circuit is electrically connected to a port of the cabinet body 6. A socket may also be externally connected to the cabinet, and the socket is electrically connected to the surge protection circuit. The port of the cabinet body 6 includes a power port or a signal port. A specific connection relationship among the surge protection circuit, the power port or the signal port of the cabinet body 6 and the socket is the same as corresponding content in Embodiment 1, which is not described again herein.

In this embodiment, it is not required to connect a varistor to the discharge tube 15 in series. In addition, the residual voltage of the surge protection circuit includes the voltage of the discharge tube only, thereby reducing the residual voltage.

Embodiment 3

Figure 9:
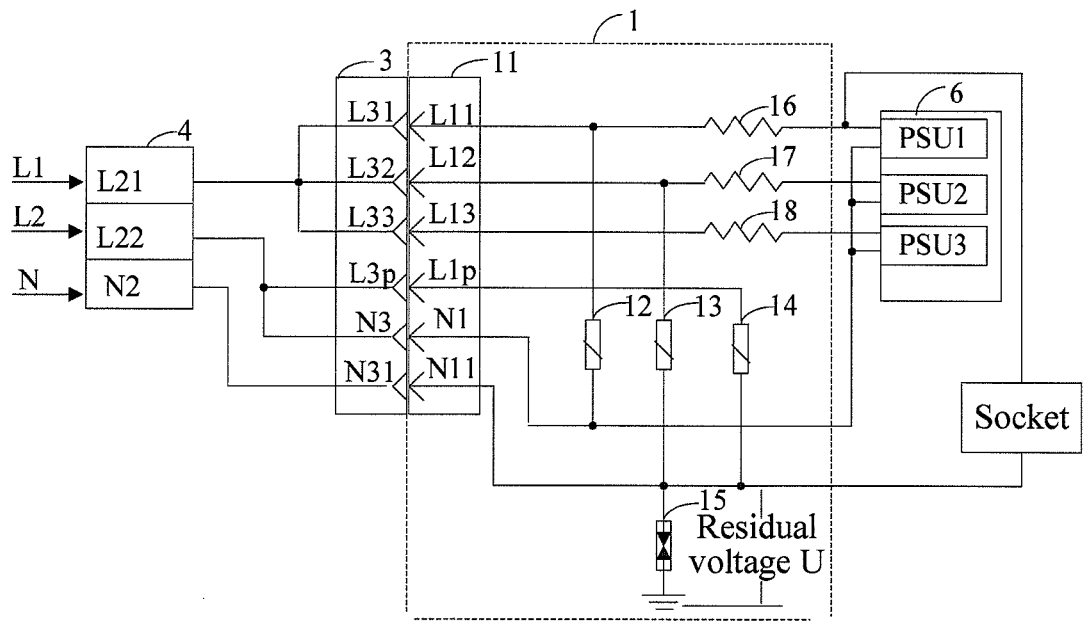
FIG. 9 is a schematic diagram of implementation of 110 V dual live wire power distribution by using a surge protection circuit provided by Embodiment 3 of the present utility model.

An embodiment of the present utility model provides a surge protection circuit, where the surge protection circuit can implement a 110 V dual live wire power distribution manner and a 220 V single-phase power distribution manner. Referring to FIG. 9, the surge protection circuit includes a surge protection unit 1, a three-row external connection terminal block 4, and a conversion terminal block 3.

A structure of the surge protection unit 1 is the same as the structure of the surge protection unit 1 provided by Embodiment 2, which is not described again herein.

The three-row external connection terminal block 4 includes a first external connection terminal L21, a second external connection terminal L22, and a third external connection terminal N2. The conversion terminal block 3 includes a first conversion terminal L31, a second conversion terminal L32, a third conversion terminal L33, a fourth conversion terminal L3p, a fifth conversion terminal N3, and a sixth conversion terminal N31. The first conversion terminal L31, the second conversion terminal L32, and the third conversion terminal L33 are electrically connected to the first external connection terminal L21. The fourth conversion terminal L3p and the fifth conversion terminal N3 are electrically connected to the second external connection terminal L22. The sixth conversion terminal N31 is electrically connected to the third external connection terminal N2.

The conversion terminal block 3 and the internal connection terminal block 11 serve as a socket and a plug, respectively; or the conversion terminal block 3 and the internal connection terminal block 11 serve as a plug and a socket, respectively. Correspondingly, by inserting the conversion terminal block 3 into the internal connection terminal block 11, the first conversion terminal L31, the second conversion terminal L32, the third conversion terminal L33, the fourth conversion terminal L3p, the fifth conversion terminal N3, and the sixth conversion terminal N31 in the conversion terminal block 3 are electrically connected to the first internal connection terminal L11, the second internal connection terminal L12, the third internal connection terminal L13, the fourth internal connection terminal L1p, the fifth internal connection terminal N1, and the sixth internal connection terminal N11 in the internal connection terminal block 11, respectively.

The three-row external connection terminal block 4 and the conversion terminal block 3 may be integrated onto a circuit board, and the conversion terminal block 3 may be directly inserted into the internal connection terminal block 11, and may also be directly pulled out from the internal connection terminal block 11.

Further, the surge protection unit 1 may also include three filter inductors, that is, a first filter inductor 16, a second filter inductor 17, and a third filter inductor 18, where the first filter inductor 16, the second filter inductor 17, and the third filter inductor 18 are electrically connected to the first internal connection terminal L11, the second internal connection terminal L12, and the third internal connection terminal L13, respectively.

Through the surge protection circuit provided by this embodiment, a 110 V dual live wire power distribution manner and a 220 V single-phase power distribution manner can be implemented.

Referring to FIG. 9, the surge protection circuit provided by this embodiment is used to implement a circuit structure of the 110 V dual live wire power distribution manner, that is, 110 V dual live wires L1 and L2 are electrically connected to the first external connection terminal L21 and the second external connection terminal L22, respectively; and a phase wire N is electrically connected to the third external connection terminal N2.

In the circuit structure of the 110 V dual live wire power distribution manner, the surge protection circuit can implement a surge protection function, and the specific implementation process is the same as a part of the content of Embodiment 1, which is not described again herein.

Figure 10:
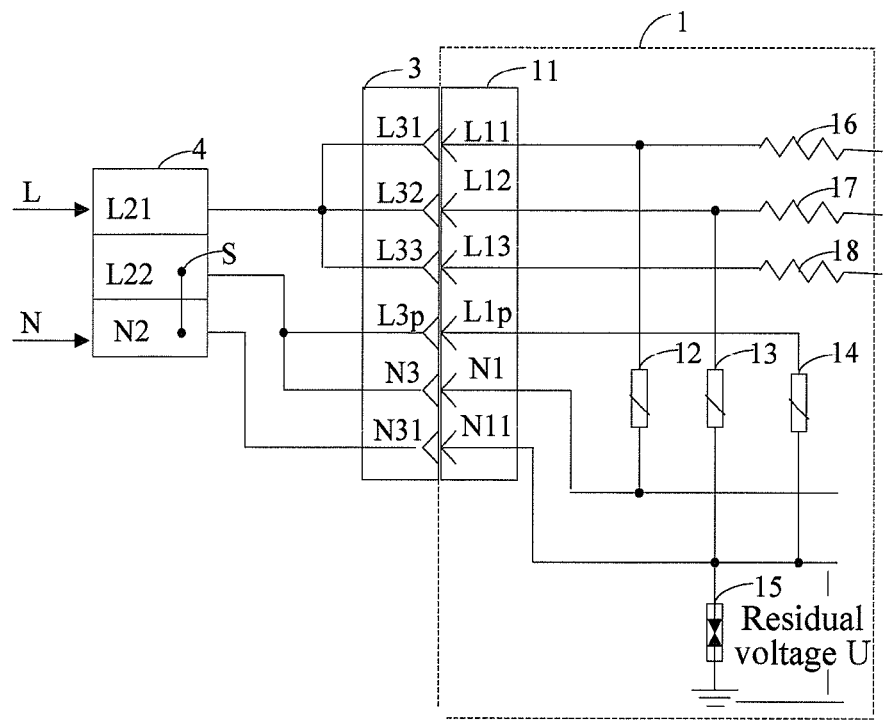
FIG. 10 is a schematic diagram of implementation of 220 V single-phase power distribution by using the surge protection circuit provided by Embodiment 3 of the present utility model.

Referring to FIG. 10, the surge protection circuit provided by this embodiment is used to implement a circuit structure of the 220 V single-phase power distribution manner, that is, a short connection sheet S is used to electrically connect the second external connection terminal L22 and the third external connection terminal N2 together. A 220 V phase wire L is electrically connected to the first external connection terminal L21, and a phase wire N is electrically connected to the third external connection terminal N2.

In the circuit structure of the 220 V single-phase power distribution manner, the surge protection circuit can implement a surge protection function, and the specific implementation process is the same as a part of the content of Embodiment 1, which is not described again herein.

Referring to FIG. 9 and FIG. 10, the internal connection terminal block 11 includes a six-row internal connection terminal, and one end of the discharge tube 15 is electrically connected to the sixth internal connection terminal N11. During implementation of 110 V dual live wire power distribution manner and the 220 V single-phase power distribution manner, it can be avoided that the live wire is directly connected to the discharge tube 15, and it is not required to connect a varistor to the discharge tube 15 in series. In addition, a residual voltage of the surge protection circuit is a voltage of the discharge tube 15, so the residual voltage of the surge protection circuit is lower than a residual voltage of an existing surge protection circuit.

The conversion terminal block 3 is electrically connected to the internal connection terminal block 11 in an insertion manner. During implementation of different power distribution manners, it is only required to use the short connection sheet S to connect a part of the external connection terminals together, and no space needs to be reserved between the conversion terminal block 3 and the internal connection terminal block 11 for wiring, thereby reducing the volume of the surge protection circuit.

Referring to FIG. 9, this embodiment provides a cabinet, including the surge protection circuit provided by this embodiment and a cabinet body 6. The surge protection circuit is electrically connected to a port of the cabinet body 6. A socket may also be externally connected to the cabinet, and the socket is electrically connected to the surge protection circuit. The port of the cabinet body 6 includes a power port or a signal port. A specific connection relationship among the surge protection circuit, the power port or the signal port of the cabinet body 6 and the socket is the same as corresponding content in Embodiment 1, which is not described again herein.

In this embodiment, it is not required to connect a varistor to the discharge tube 15 in series. In addition, the residual voltage of the surge protection circuit includes the voltage of the discharge tube only, thereby reducing the residual voltage of the surge protection circuit.

Embodiment 4

Figure 11:
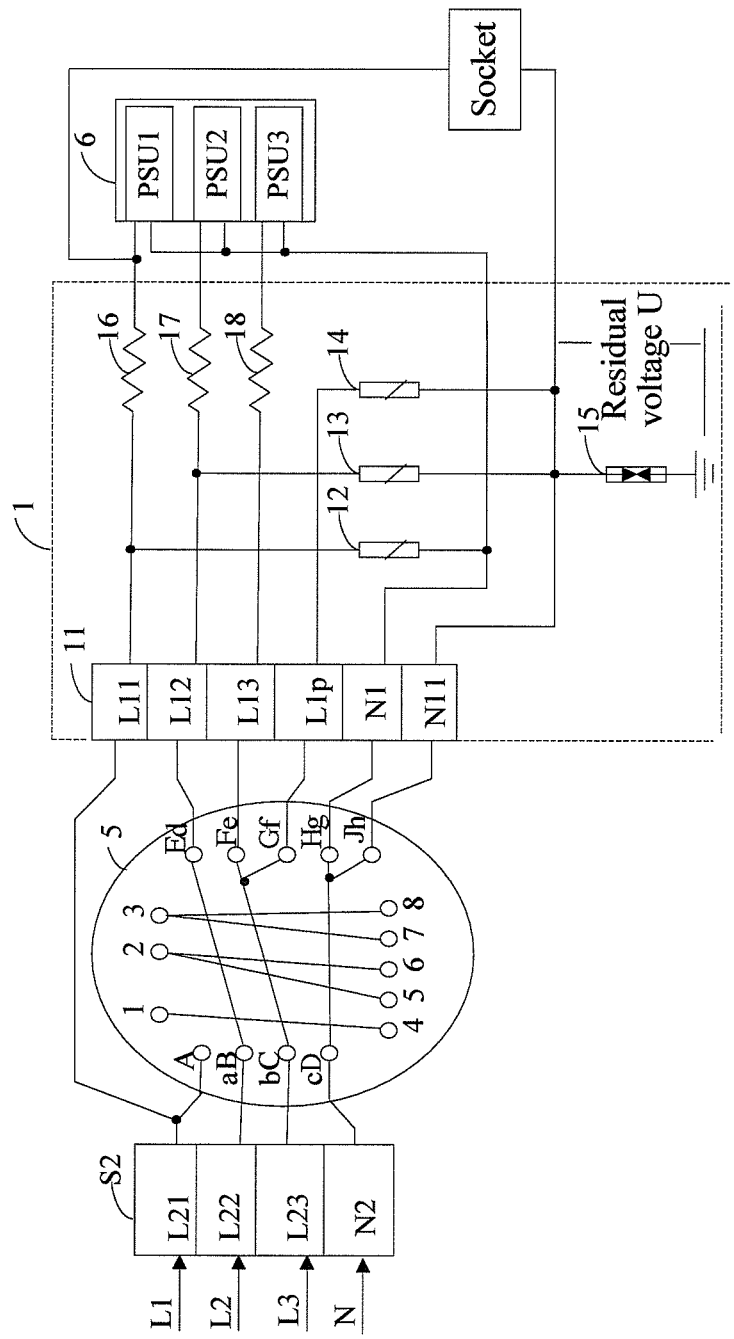
FIG. 11 is a schematic diagram of implementation of 220 V three-phase power distribution by using a surge protection circuit provided by Embodiment 4 of the present utility model.

As shown in FIG. 11, an embodiment of the present utility model provides a surge protection circuit, including a surge protection unit 1, a four-row external connection terminal block S2, and a rotation terminal 5.

A structure of the surge protection unit 1 is the same as the structure of the surge protection unit 1 provided by Embodiment 1, which is not described again herein.

The four-row external connection terminal block S2 includes a first external connection terminal L21, a second external connection terminal L22, a third external connection terminal L23, and a fourth external connection terminal N2.

Figure 12:
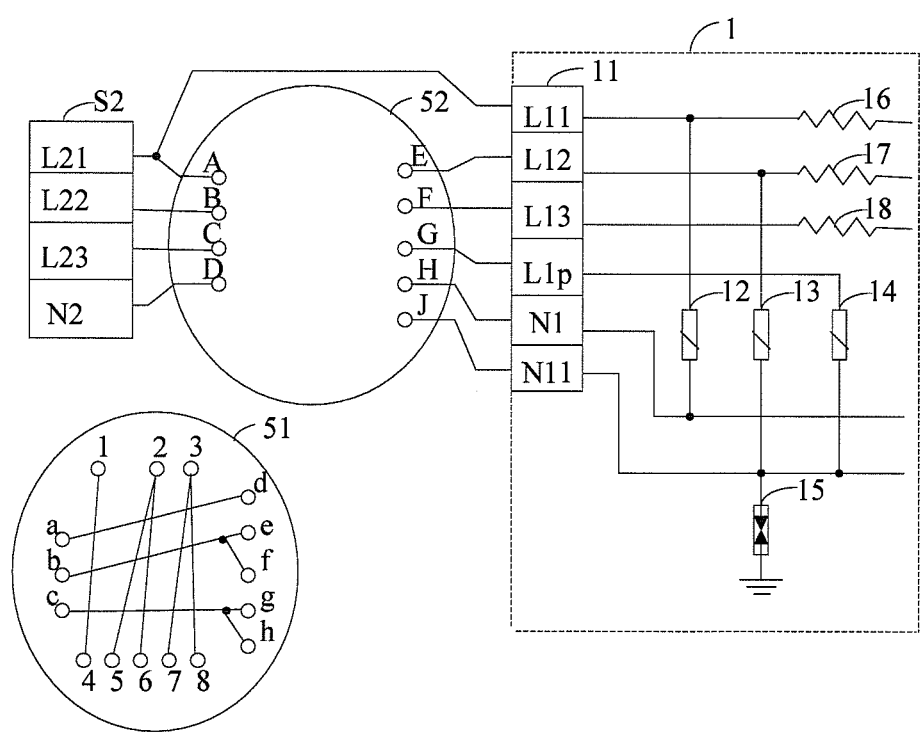
FIG. 12 is a schematic diagram of the surge protection circuit provided by Embodiment 4 of the present utility model.

Referring to FIG. 12, the rotation terminal 5 includes a rotation disk 51 and a fixed disk 52. The rotation disk 51 includes a first contact a, a second contact b, a third contact c, a fourth contact d, a fifth contact e, a sixth contact f, a seventh contact g, an eighth contact h, a ninth contact 1, a tenth contact 2, an eleventh contact 3, a twelfth contact 4, a thirteenth contact 5, a fourteenth contact 6, a fifteenth contact 7, and a sixteenth contact 8. The first contact a is electrically connected to the fourth contact d. The second contact b, the fifth contact e, and the sixth contact f are electrically connected together. The third contact c, the seventh contact g, and the eighth contact h are electrically connected together. The ninth contact 1 is electrically connected to the twelfth contact 4. The tenth contact 2, the thirteenth contact 5, and the fourteenth contact 6 are electrically connected together. The eleventh contact 3, the fifteenth contact 7, and the sixteenth contact 8 are electrically connected together. The fixed disk 52 includes a first contact A, a second contact B, a third contact C, a fourth contact D, a fifth contact E, a sixth contact F, a seventh contact G, an eighth contact H, and a ninth contact J.

The first internal connection terminal L11, the first external connection terminal L21, and the first contact A of the fixed disk 52 are electrically connected together. The second internal connection terminal L12, the third internal connection terminal L13, the fourth internal connection terminal L1p, the fifth internal connection terminal N1, and the sixth internal connection terminal N11 are electrically connected to the fifth contact E, the sixth contact F, the seventh contact G, the eighth contact H, and the ninth contact J in the fixed disk 52, respectively. The second external connection terminal L22, the third external connection terminal L23, and the fourth external connection terminal N2 are electrically connected to the second contact B, the third contact C, and the fourth contact D, respectively. The rotation disk 51 is mounted on the fixed disk 52 and can be rotated on the fixed disk 52.

Further, the surge protection unit 1 may also include three filter inductors, that is, a first filter inductor 16, a second filter inductor 17, and a third filter inductor 18, where the first filter inductor 16, the second filter inductor 17, and the third filter inductor 18 are electrically connected to the first internal connection terminal L11, the second internal connection terminal L12, and the third internal connection terminal L13, respectively.

Through the surge protection circuit provided by this embodiment, a 220 V three-phase power distribution manner, a 220 V single-phase power distribution manner, and a 110 V dual live wire power distribution manner can be implemented.

As shown in FIG. 11, the surge protection circuit provided by this embodiment is used to implement a circuit structure of the 220 V three-phase power distribution manner, that is, the rotation disk 51 is rotated so that the first contact a, the second contact b, the third contact c, the fourth contact d, the fifth contact e, the sixth contact f, the seventh contact g, and the eighth contact h are in electrical contact with the second contact B, the third contact C, the fourth contact D, the fifth contact E, the sixth contact F, the seventh contact G, the eighth contact H, and the ninth contact J on the fixed disk 52, respectively. The 220 V three-phase wires L1, L2, and L3 are electrically connected to the first external connection terminal L21, the second external connection terminal L22, and the third external connection terminal L23, respectively. A phase wire N is electrically connected to the fourth external connection terminal N2.

In the circuit structure of the 220 V three-phase power distribution manner, the surge protection circuit can implement a surge protection function, and the specific implementation process is the same as a part of the content of Embodiment 1, which is not described again herein.

Figure 13:
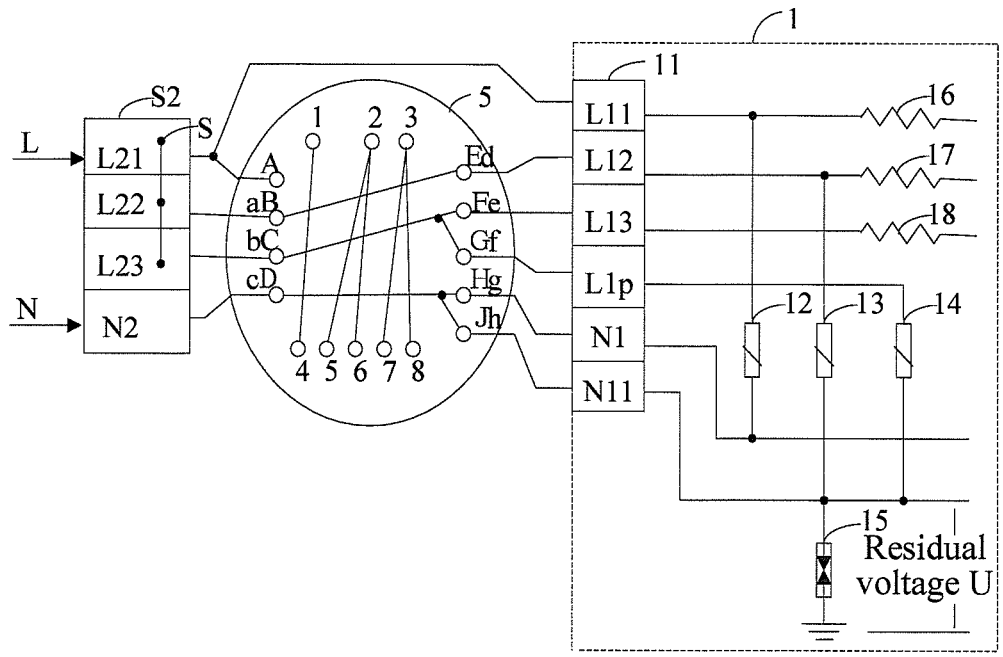
FIG. 13 is a schematic diagram of implementation of 220 V single-phase power distribution by using the surge protection circuit provided by Embodiment 4 of the present utility model.

As shown in FIG. 13, the surge protection circuit provided by this embodiment is used to implement a circuit structure of the 220 V single-phase power distribution manner, that is, the rotation disk 51 is rotated so that the first contact a, the second contact b, the third contact c, the fourth contact d, the fifth contact e, the sixth contact f, the seventh contact g, and the eighth contact h are in electrical contact with the second contact B, the third contact C, the fourth contact D, the fifth contact E, the sixth contact F, the seventh contact G, the eighth contact H, and the ninth contact J on the fixed disk 52. Short connection sheets S are used to electrically connect the external connection terminals L21, L22, and L23 together. A 220 V phase wire L is electrically connected to the first external connection terminal L21. A phase wire N is electrically connected to the fourth external connection terminal N2.

In the circuit structure of the 220 V single-phase power distribution manner, the surge protection circuit can implement a surge protection function, and the specific implementation process is the same as a part of the content of Embodiment 1, which is not described again herein.

Figure 14:
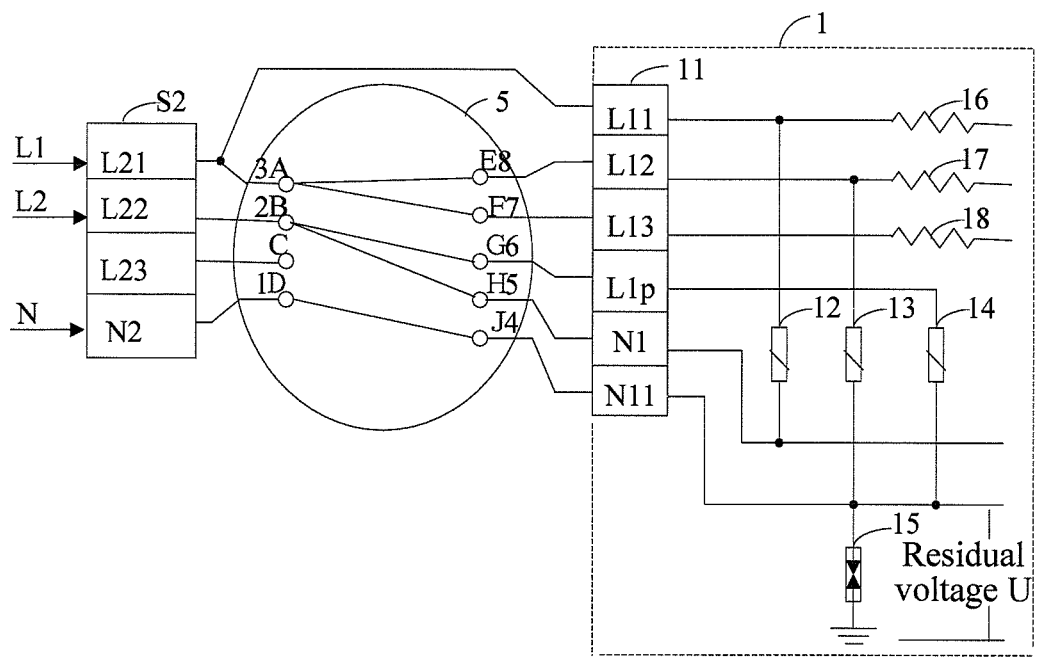
FIG. 14 is a schematic diagram of implementation of 110 V dual live wire power distribution by using the surge protection circuit provided by Embodiment 4 of the present utility model.

As shown in FIG. 14, the surge protection circuit provided by this embodiment is used to implement a circuit structure of the 110 V dual live wire power distribution manner, that is, the rotation disk 51 is rotated so that the ninth contact 1, the tenth contact 2, the eleventh contact 3, the twelfth contact 4, the thirteenth contact 5, the fourteenth contact 6, the fifteenth contact 7, and the sixteenth contact 8 are in electrical contact with the fourth contact D, the second contact B, the first contact A, the ninth contact J, the eighth contact H, the seventh contact G, the sixth contact F, and the fifth contact E on the fixed disk 52, respectively. The 110 V dual live wires L1 and L2 are electrically connected to the first external connection terminal L21 and the second external connection terminal L22, respectively. A phase wire N is electrically connected to the fourth external connection terminal N2.

In the circuit structure of the 110 V dual live wire power distribution manner, the surge protection circuit can implement a surge protection function, and the specific implementation process is the same as a part of the content of Embodiment 1, which is not described again herein.

Referring to FIG. 14, the internal connection terminal block 11 includes a six-row internal connection terminal, and one end of the discharge tube 15 is electrically connected to the sixth internal connection terminal N11. During implementation of the 220 V three-phase power distribution manner, the 220 V single-phase power distribution manner, and the 110 V dual live wire power distribution manner, it can be avoided that the live wire is directly connected to the discharge tube 15, and it is not required to connect a varistor to the discharge tube 15 in series. In addition, a residual voltage of the surge protection circuit is a voltage of the discharge tube 15, so the residual voltage of the surge protection circuit is lower than a residual voltage of an existing surge protection circuit.

The four-row external connection terminal block S2 and the rotation terminal 5 are electrically connected to the internal connection terminal block 11 directly. During implementation of different power distribution manners, it is only required to use the short connection sheet S to connect a part of the external connection terminals together, and no space needs to be reserved in the surge protection circuit for wiring, thereby reducing the volume of the surge protection circuit.

Referring to FIG. 11, this embodiment provides a cabinet, including the surge protection circuit provided by this embodiment and a cabinet body 6. The surge protection circuit is electrically connected to a port of the cabinet body 6. A socket may also be externally connected to the cabinet, and the socket is electrically connected to the surge protection circuit. The port of the cabinet body 6 includes a power port or a signal port. A specific connection relationship among the surge protection circuit, the power port or the signal port of the cabinet body 6 and the socket is the same as corresponding content in Embodiment 1, which is not described again herein.

In this embodiment, it is not required to connect a varistor to the discharge tube 15 in series. In addition, the residual voltage of the surge protection circuit includes the voltage of the discharge tube only, thereby reducing the residual voltage. In addition, different power distribution manners can be implemented by rotating the rotation disk, thereby being convenient for the user and improving user experience.

Embodiment 5

Figure 15:
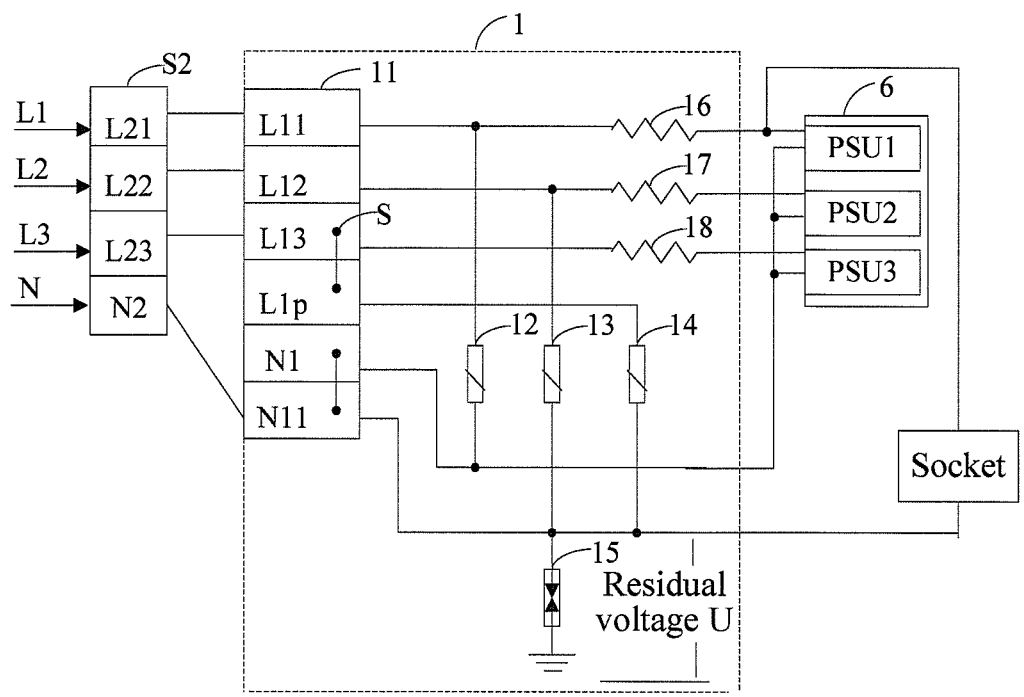
FIG. 15 is a schematic diagram of implementation of 220 V three-phase power distribution by using a surge protection circuit provided by Embodiment 5 of the present utility model.

As shown in FIG. 15, an embodiment of the present utility model provides a surge protection circuit, including a surge protection unit 1 and a four-row external connection terminal block S2.

A structure of the surge protection unit 1 is the same as the structure of the surge protection unit 1 provided by Embodiment 1, which is not described again herein.

A structure of the four-row external connection terminal block S2 is the same as the structure of four-row external connection terminal block S2 provided by Embodiment 4, which is not described again herein.

A first external connection terminal L21, a third external connection terminal L23, and a fourth external connection terminal N2 are electrically connected to a first internal connection terminal L11, a third internal connection terminal L13, and a sixth internal connection terminal N11, respectively.

Further, the surge protection unit 1 may also include three filter inductors, that is, a first filter inductor 16, a second filter inductor 17, and a third filter inductor 18, where the first filter inductor 16, the second filter inductor 17, and the third filter inductor 18 are electrically connected to the first internal connection terminal L11, the second internal connection terminal L12, and the third internal connection terminal L13, respectively.

Through the surge protection circuit provided by this embodiment, a 220 V three-phase power distribution manner, a 220 V single-phase power distribution manner, and a 110 V dual live wire power distribution manner can be implemented.

As shown in FIG. 15, the surge protection circuit provided by this embodiment is used to implement a circuit structure of the 220 V three-phase power distribution manner, that is, short connection sheets S are used to connect the third internal connection terminal L13 and the fourth L1p together and connect the fifth internal connection terminal N1 and the sixth internal connection terminal N11 together. Cables are used to electrically connect the second external connection terminal L22 to the second internal connection terminal L12, electrically connect 220 V three-phase wires L1, L2, and L3 to the first external connection terminal L21, the second external connection terminal L22, and the third external connection terminal L23, respectively; and electrically connect a phase wire N to the fourth external connection terminal N2.

In the circuit structure of the 220 V three-phase power distribution manner, the surge protection circuit can implement a surge protection function, and the specific implementation process is the same as a part of the content of Embodiment 1, which is not described again herein.

Figure 16:
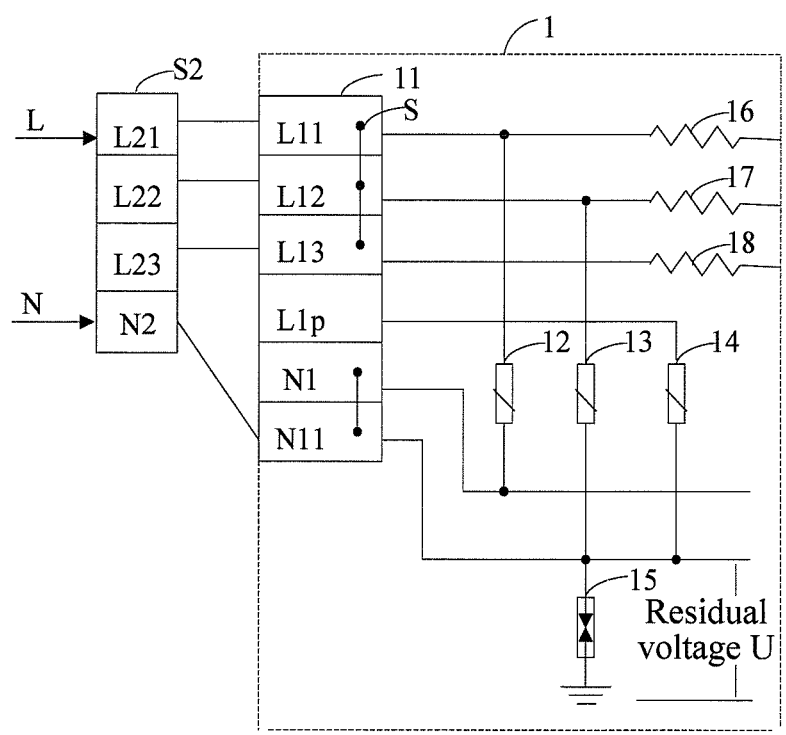
FIG. 16 is a schematic diagram of implementation of 220 V single-phase power distribution by using the surge protection circuit provided by Embodiment 5 of the present utility model.

As shown in FIG. 16, the surge protection circuit provided by this embodiment is used to implement a circuit structure of the 220 V single-phase power distribution manner, that is, short connection sheets S are used to connect the first internal connection terminal L11, the second internal connection terminal L12, and the third internal connection terminal L13 together and connect the fifth internal connection terminal N1 and the sixth internal connection terminal N11 together. Cables are used to electrically connect the second external connection terminal L22 to the second internal connection terminal L12, electrically connect a 220 V phase wire L to the first external connection terminal L21, and electrically connect a phase wire N to the fourth external connection terminal N2.

In the circuit structure of the 220 V single-phase power distribution manner, the surge protection circuit can implement a surge protection function, and the specific implementation process is the same as a part of the content of Embodiment 1, which is not described again herein.

Figure 17:
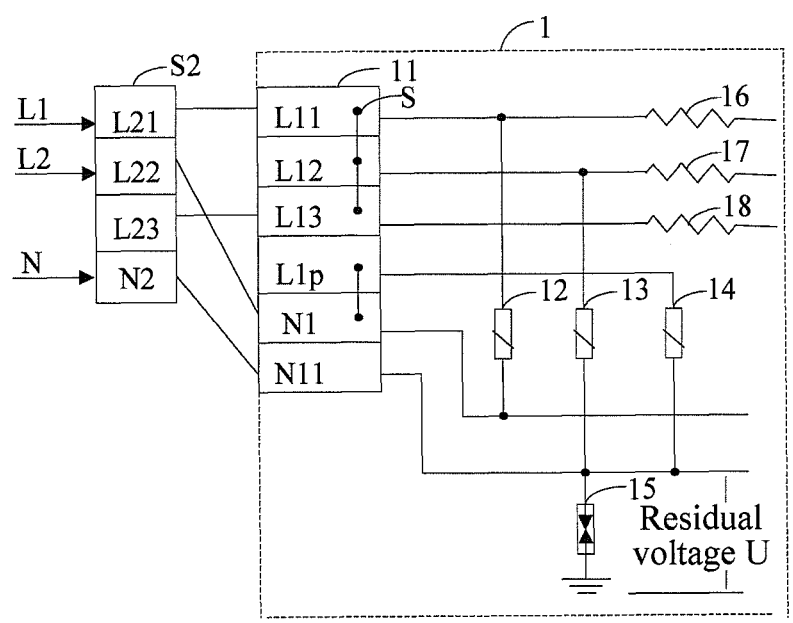
FIG. 17 is a schematic diagram of implementation of 110 V dual live wire power distribution by using the surge protection circuit provided by Embodiment 5 of the present utility model.

As shown in FIG. 17, the surge protection circuit provided by this embodiment is used to implement a circuit structure of the 110 V dual live wire power distribution manner, that is, short connection sheets S are used to connect the fifth internal connection terminal N1 and the fourth internal connection terminal L1p together and connect the first internal connection terminal L11, the second internal connection terminal L12, and the third internal connection terminal L13 together. Cables are used to electrically connect the second external connection terminal L22 to the fifth internal connection terminal N1, electrically connect 110 V dual live wires L1 and L2 to the first external connection terminal L21 and the second external connection terminal L22, respectively; and electrically connect a phase wire N to the fourth external connection terminal N2.

In the circuit structure of the 110 V dual live wire power distribution manner, the surge protection circuit can implement a surge protection function, and the specific implementation process is the same as a part of the content of Embodiment 1, which is not described again herein.

Referring to FIG. 17, the internal connection terminal block 11 includes a six-row internal connection terminal, and one end of the discharge tube 15 is electrically connected to the sixth internal connection terminal N11. During implementation of the 220 V three-phase power distribution manner, the 220 V single-phase power distribution manner, and the 110 V dual live wire power distribution manner, it can be avoided that the live wire is directly connected to the discharge tube 15, and it is not required to connect a varistor to the discharge tube 15 in series. In addition, a residual voltage of the surge protection circuit is a voltage of the discharge tube 15, so the residual voltage of the surge protection circuit is lower than a residual voltage of an existing surge protection circuit.

Referring to FIG. 15, this embodiment provides a cabinet, including the surge protection circuit provided by this embodiment and a cabinet body 6. The surge protection circuit is electrically connected to a port of the cabinet body 6. A socket may also be externally connected to the cabinet, and the socket is electrically connected to the surge protection circuit. The port of the cabinet body 6 includes a power port or a signal port. A specific connection relationship among the surge protection circuit, the power port or the signal port of the cabinet body 6 and the socket is the same as corresponding content in Embodiment 1, which is not described again herein.

In this embodiment, it is not required to connect a varistor to the discharge tube 15 in series. In addition, the residual voltage of the surge protection circuit includes the voltage of the discharge tube only, thereby reducing the residual voltage of the surge protection circuit.

The above descriptions are merely exemplary embodiments of the present utility model, and are not intended to limit the present utility model. Any modifications, equivalent substitutions and improvements made within the spirit and principle of the present utility model should be included within the scope of protection of the present utility model.

What is claimed is:

1. A surge protection circuit, comprising:
an interface; and
a surge protection unit electrically connected to the interface, the surge protection circuit comprising:
a first varistor, a second varistor, a third varistor and a discharge tube,
an internal connection terminal block comprising: a first internal connection terminal, a second internal connection terminal, a third internal connection terminal, a fourth internal connection terminal, a fifth internal connection terminal, and a sixth internal connection terminal,
wherein a first end of the first varistor, a first end of the second varistor, and a first end of the third varistor are electrically connected to the first internal connection terminal, the second internal connection terminal, and the fourth internal connection terminal, respectively, and
wherein a second end of the first varistor is electrically connected to the fifth internal connection terminal, a second end of the second varistor and a second end of the third varistor are connected together and are electrically connected to the sixth internal connection terminal and to a first end of the discharge tube, and a second end of the discharge tube is coupled to ground;
wherein the interface comprises a four-row external connection terminal block and a rotation terminal, wherein the four-row external connection terminal block comprises a first external connection terminal, a second external connection terminal, a third external connection terminal, and a fourth external connection terminal; and
the first external connection terminal, the first internal connection terminal, and the rotation terminal are electrically connected together; the second external connection terminal, the third external connection terminal, and the fourth external connection terminal, the second internal connection terminal, the third internal connection terminal, the fourth internal connection terminal, the fifth internal connection terminal, and the sixth internal connection terminal are electrically connected to the rotation terminal.

2. The surge protection circuit according to claim 1, wherein
the interface is a six-row external connection terminal block, wherein the six-row external connection terminal block comprises a first external connection terminal, a second external connection terminal, a third external connection terminal, a fourth external connection terminal, a fifth external connection terminal, and a sixth external connection terminal; and
the first external connection terminal, the second external connection terminal, the third external connection terminal, the fourth external connection terminal, the fifth external connection terminal, and the sixth external connection terminal are electrically connected to the first internal connection terminal, the second internal connection terminal, the third internal connection terminal, the fourth internal connection terminal, the fifth internal connection terminal, and the sixth internal connection terminal, respectively.

3. The surge protection circuit according to claim 1, wherein
the interface comprises a four-row external connection terminal block and a conversion terminal block, wherein the four-row external connection terminal block comprises a first external connection terminal, a second external connection terminal, a third external connection terminal, and a fourth external connection terminal, and the conversion terminal block comprises a first conversion terminal, a second conversion terminal, a third conversion terminal, a fourth conversion terminal, a fifth conversion terminal, and a sixth conversion terminal; and
the first conversion terminal and the second conversion terminal are electrically connected to the first external connection terminal and the second external connection terminal, respectively; the third conversion terminal and the fourth conversion terminal are electrically connected to the third external connection terminal, and the fifth conversion terminal and the sixth conversion terminal are electrically connected to the fourth external connection terminal.

4. The surge protection circuit according to claim 3, wherein
the conversion terminal block and the internal connection terminal block serve as a socket and a plug, respectively; or the conversion terminal block and the internal connection terminal block serve as a plug and a socket, respectively; and
the conversion terminal block is inserted into the internal connection terminal block, so that the first conversion terminal, the second conversion terminal, the third conversion terminal, the fourth conversion terminal, the fifth conversion terminal, and the sixth conversion terminal are electrically connected to the first internal connection terminal, the second internal connection terminal, the third internal connection terminal, the fourth internal connection terminal, the fifth internal connection terminal, and the sixth internal connection terminal comprised in the internal connection terminal block, respectively.

5. The surge protection circuit according to claim 1, wherein
the interface comprises a three-row external connection terminal block and a conversion terminal block, wherein the three-row external connection terminal block comprises a first external connection terminal, a second external connection terminal, and a third external connection terminal, and the conversion terminal block comprises a first conversion terminal, a second conversion terminal, a third conversion terminal, a fourth conversion terminal, a fifth conversion terminal, and a sixth conversion terminal; and
the first conversion terminal, the second conversion terminal, and the third conversion terminal are electrically connected to the first external connection terminal, the fourth conversion terminal and the fifth conversion terminal are electrically connected to the second external connection terminal, and the sixth conversion terminal is electrically connected to the third external connection terminal.

6. The surge protection circuit according to claim 5, wherein
the conversion terminal block and the internal connection terminal block serve as a socket and a plug, respectively; or the conversion terminal block and the internal connection terminal block serve as a plug and a socket, respectively; and
the conversion terminal block is inserted into the internal connection terminal block, so that the first conversion terminal, the second conversion terminal, the third conversion terminal, the fourth conversion terminal, the fifth conversion terminal, and the sixth conversion terminal are electrically connected to the first internal connection terminal, the second internal connection terminal, the third internal connection terminal, the fourth internal connection terminal, the fifth internal connection terminal, and the sixth internal connection terminal comprised in the internal connection terminal block, respectively.

7. The surge protection circuit according to claim 1, wherein
the rotation terminal comprises a rotation disk and a fixed disk, wherein the rotation disk is mounted on the fixed disk and the rotation disk rotates on the fixed disk;
the fixed disk comprises a first contact, a second contact, a third contact, a fourth contact, a fifth contact, a sixth contact, a seventh contact, an eighth contact, and a ninth contact, wherein the first contact, the first external connection terminal, and the first internal connection terminal are electrically connected together, the second contact, the third contact, the fourth contact, the fifth contact, the sixth contact, the seventh contact, the eighth contact, and the ninth contact are electrically connected to the second external connection terminal, the third external connection terminal, and the fourth external connection terminal, the second internal connection terminal, the third internal connection terminal, the fourth internal connection terminal, the fifth internal connection terminal, and the sixth internal connection terminal, respectively; and
the rotation disk comprises a first contact, a second contact, a third contact, a fourth contact, a fifth contact, a sixth contact, a seventh contact, an eighth contact, a ninth contact, a tenth contact, a eleventh contact, a twelfth contact, a thirteenth contact, a fourteenth contact, a fifteenth contact, and a sixteenth contact, wherein the first contact is electrically connected to the fourth contact, the second contact is electrically connected to the fifth contact and the sixth contact, the third contact is electrically connected to the seventh contact and the eighth contact, the ninth contact is electrically connected to the twelfth contact, the tenth contact is electrically connected to the thirteenth contact and the fourteenth contact, and the eleventh contact is electrically connected to the fifteenth contact and the sixteenth contact.

8. The surge protection circuit according to claim 7, wherein
the rotation disk is rotated, so that the first contact, the second contact, the third contact, the fourth contact, the fifth contact, the sixth contact, the seventh contact, and the eighth contact in the rotation disk are in electrical contact with and electrically connected to the second contact, the third contact, the fourth contact, the fifth contact, the sixth contact, the seventh contact, the eighth contact, and the ninth contact in the fixed disk, respectively; or the ninth contact, the tenth contact, the eleventh contact, the twelfth contact, the thirteenth contact, the fourteenth contact, the fifteenth contact, and the sixteenth contact in the rotation disk are in electrical contact with and electrically connected to the fourth contact, the second contact, the first contact, the ninth contact, the eighth contact, the seventh contact, the sixth contact, and the fifth contact in the fixed disk, respectively.

9. The surge protection circuit according to claim 1, wherein
the interface comprises a four-row external connection terminal block, wherein the four-row external connection terminal block comprises a first external connection terminal, a second external connection terminal, a third external connection terminal, and a fourth external connection terminal; and
the first external connection terminal, the third external connection terminal, and the fourth external connection terminal are electrically connected to the first internal connection terminal, the third internal connection terminal, and the sixth internal connection terminal in the internal connection terminal block, respectively.

10. The surge protection circuit according to claim 1, wherein the surge protection unit further comprises three filter inductors, wherein
the three filter inductors are electrically connected to the internal connection terminal block.

11. A surge protection circuit, comprising:
an interface comprising:
a rotation terminal, and a four-row external connection terminal block comprising: a first external connection terminal, a second external connection terminal, a third external connection terminal, and a fourth external connection terminal;

a surge protection unit electrically connected to the interface, the surge protection circuit comprising:

a first varistor, a second varistor, a third varistor and a discharge tube, an internal connection terminal block comprising: a first internal connection terminal, a second internal connection terminal, a third internal connection terminal, a fourth internal connection terminal, a fifth internal connection terminal, and a sixth internal connection terminal, wherein a first end of the first varistor, a first end of the second varistor, and a first end of the third varistor are electrically connected to the first internal connection terminal, the second internal connection terminal, and the fourth internal connection terminal, respectively, and wherein a second end of the first varistor is electrically connected to the fifth internal connection terminal, a second end of the second varistor and a second end of the third varistor are connected together and are electrically connected to the sixth internal connection terminal and to a first end of the discharge tube, and a second end of the discharge tube is coupled to ground;

wherein the first external connection terminal, the first internal connection terminal, and the rotation terminal are electrically connected together; and wherein the second external connection terminal, the third external connection terminal, the fourth external connection terminal, the second internal connection terminal, the third internal connection terminal, the fourth internal connection terminal, the fifth internal connection terminal, and the sixth internal connection terminal are electrically connected to the rotation terminal.

12. The surge protection circuit according to claim 11, wherein:

the rotation terminal comprises a rotation disk and a fixed disk, wherein the rotation disk is mounted on the fixed disk and the rotation disk rotates on the fixed disk;

the fixed disk comprises a first contact, a second contact, a third contact, a fourth contact, a fifth contact, a sixth contact, a seventh contact, an eighth contact, and a ninth contact, wherein the first contact, the first external connection terminal, and the first internal connection terminal are electrically connected together, the second contact, the third contact, the fourth contact, the fifth contact, the sixth contact, the seventh contact, the eighth contact, and the ninth contact are electrically connected to the second external connection terminal, the third external connection terminal, and the fourth external connection terminal, the second internal connection terminal, the third internal connection terminal, the fourth internal connection terminal, the fifth internal connection terminal, and the sixth internal connection terminal, respectively; and the rotation disk comprises a first contact, a second contact, a third contact, a fourth contact, a fifth contact, a sixth contact, a seventh contact, an eighth contact, a ninth contact, a tenth contact, an eleventh contact, a twelfth contact, a thirteenth contact, a fourteenth contact, a fifteenth contact, and a sixteenth contact, wherein the first contact is electrically connected to the fourth contact, the second contact is electrically connected to the fifth contact and the sixth contact, the third contact is electrically connected to the seventh contact and the eighth contact, the ninth contact is electrically connected to the twelfth contact, the tenth contact is electrically connected to the thirteenth contact and the fourteenth contact, and the eleventh contact is electrically connected to the fifteenth contact and the sixteenth contact.

13. The surge protection circuit according to claim 12, wherein:

the rotation disk is rotated, so that the first contact, the second contact, the third contact, the fourth contact, the fifth contact, the sixth contact, the seventh contact, and the eighth contact in the rotation disk are in electrical contact with and electrically connected to the second contact, the third contact, the fourth contact, the fifth contact, the sixth contact, the seventh contact, the eighth contact, and the ninth contact in the fixed disk, respectively; or the ninth contact, the tenth contact, the eleventh contact, the twelfth contact, the thirteenth contact, the fourteenth contact, the fifteenth contact, and the sixteenth contact in the rotation disk are in electrical contact with and electrically connected to the fourth contact, the second contact, the first contact, the ninth contact, the eighth contact, the seventh contact, the sixth contact, and the fifth contact in the fixed disk, respectively.

* * * * *